United States Patent
Panje

(10) Patent No.: US 11,641,610 B2
(45) Date of Patent: May 2, 2023

(54) WI-FI MULTIPLE ACCESS POINT—USER FRIENDLY INSTALLATION

(71) Applicant: ARRIS Enterprises LLC, Suwanee, GA (US)

(72) Inventor: Krishna Prasad Panje, Bengaluru (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 102 days.

(21) Appl. No.: 17/323,229

(22) Filed: May 18, 2021

(65) Prior Publication Data

US 2022/0053404 A1 Feb. 17, 2022

Related U.S. Application Data

(60) Provisional application No. 63/065,812, filed on Aug. 14, 2020.

(51) Int. Cl.
| | | |
|---|---|---|
| *H04W 40/02* | (2009.01) | |
| *H04W 84/12* | (2009.01) | |
| *H04W 88/08* | (2009.01) | |

(52) U.S. Cl.
CPC ............ *H04W 40/02* (2013.01); *H04W 84/12* (2013.01); *H04W 88/08* (2013.01)

(58) Field of Classification Search
CPC ...... H04W 40/02; H04W 84/12; H04W 88/08
See application file for complete search history.

(56) References Cited

U.S. PATENT DOCUMENTS

| | | | |
|---|---|---|---|
| 2017/0272317 A1 | 9/2017 | Singla et al. | |
| 2017/0366983 A1* | 12/2017 | Gunasekara | ........ H04L 43/0811 |
| 2018/0288614 A1* | 10/2018 | Zaks | ................... H04L 63/0428 |
| 2020/0204974 A1 | 6/2020 | Strater et al. | |

FOREIGN PATENT DOCUMENTS

EP 3340679 A1 * 6/2018

OTHER PUBLICATIONS

International Search Report and the Written Opinion of the International Searching Authority dated Sep. 8, 2021 in International (PCT) Application No. PCT/US2021/032901.
International Preliminary Report on Patentability dated Feb. 7, 2023 in International (PCT) Application No. PCT/US2021/032901.

* cited by examiner

*Primary Examiner* — Mohammad S Anwar
(74) *Attorney, Agent, or Firm* — Wenderoth, Lind & Ponack, L.L.P.

(57) ABSTRACT

An electronic apparatus, method, and computer-readable medium implement a dynamic channel selection function at an access point device so as to establish a backhaul connection between the access point device and an extender access point device. Once initiated either by the access point device or an application, the dynamic channel selection function iterates or loops through channels based on one or more factors to select a channel for establishment of the backhaul connection. The dynamic channel selection function provides ease of installation of configuration of devices on a network without requiring relocation of the device to establish the backhaul connection.

20 Claims, 5 Drawing Sheets

WI-FI MULTIPLE ACCESS POINT—USER FRIENDLY INSTALLATION

BACKGROUND

Companies are increasingly providing Multiple Access Point (MAP) architecture or Home Network Controller (HNC) type of home Wi-Fi management, with multiple access point devices and/or extender access point devices within the home to improve Quality of Experience (QoE) of the user by offering extended coverage with seamless roaming. Access point devices and extender access point devices communicate with client devices using one or more RF channels. Typically, 5 GigaHertz (GHz) radio is used for Wi-Fi backhaul in extender access point devices because such offers more bandwidth with less interference and greater reliability when compared to 2.4 GHz radio.

Configuration of home network access point devices and/or extender access point devices is increasingly being performed by users without assistance from a professional. New guidelines even discourage the requirement of professionals for setting up home network access point devices and/or extender access point devices. This move towards a user-only configuration and/or set-up introduces new challenges for associating extender access point devices to a home network access point device.

Many customers often experience a problem with connecting or associating an access point device (also referred to as APD) with an extender access point device (also referred to as EAPD). Generally, as part of the initial onboarding/configuration, the backhaul (BH) service set identifier (SSID) is indicated to the extender access point device (as part of a configuration push, a Wi-Fi Protected Setup (WPS) M8 message, or an initial Bluetooth low energy (BLE) connection to the extender access point device from an application). The extender access point device then latches on or is associated/connected to the BH SSID. However, depending upon the location of the extender access point device, the environment, or any other network issues, the extender access point device may fail to latch on to or associate with/connect to the BH SSID. In addition, the extender access point device may have a lengthy lag time (for example, three or four minutes or longer) for associating or connecting with the BH SSID such that the user may assume the association or connection has failed and as a result may take unnecessary and costly actions. Further, the BH channel selected by the access point device is prone to interference with respect to the extender access point device and/or has effective power levels such that the extender access point device fails to hear the access point device and association requests from the extender access point device to be received by the access point device.

Generally, to resolve the above-described problem, the location of installation of the extender access point device is requested (for example, by indication from an application or other indicator) to be relocated to a location closer in proximity to the access point device. However, relocation of the extender access point device is not always feasible or practical. For example, the different location may not provide the required coverage or coverage may be compromised, have inadequate or nonexistent power portals (such as power sockets or power outlets), and/or not be aesthetically acceptable or pleasing.

Therefore, there is a need to provide improved electronic apparatuses (e.g., APDs, wireless access points (APs), EAPDs, Wi-Fi extenders, etc.) that are configured to perform a method to improve the establishment of a BH connection between an access point device and an extender access point device after an initial failure, particularly when a user is unable to relocate the extender access point device. This improvement will significantly enhance the installation, reconfiguration and further usages of APDs and/or EAPDs within a particular network or environment.

SUMMARY

According to aspects of the present disclosure there are provided novel solutions for establishing a BH connection between an access point device (APD) and an extender access point device (EAPD) of, for example, a local area network (LAN), a wireless local area network (WLAN), or a personal area network (PAN), after an initial failure. In addition, there is provided an alternative initiation of the establishment of the BH connection between an access point device and an extender access point device after an initial failure through the use of an electronic apparatus such as an electronic device (e.g., a mobile phone) that initiates connection requests to the access point device and the extender access point device, for example, via a software application accessible by a user. The aspects of the present disclosure provide features that enhance connectivity between access point devices and extender access point device to improve SSID availability with a "Dynamic Channel Selection" function, and which may be incorporated into access point devices (for example, home/residential network access point devices, wireless extender access point devices (Wi-Fi APs), Home Network Controller devices, wireless routers, mesh networking nodes (e.g., Wi-Fi EasyMesh systems), and the like.

An aspect of the present disclosure provides an access point device (APD) for use with an extender access point device (EAPD) and for establishing a backhaul connection to the EAPD. The APD comprises a memory storing one or more computer-readable instructions, and a process configured to execute the one or more computer-readable instructions to perform one or more operations, the one or more operations comprising establishing an initial fronthaul connection to the EAPD over a fronthaul service set identifier (SSID) as part of a Wi-Fi protected setup (WPS) operation, sending an initial backhaul configuration with a backhaul SSID and one or more credentials to the EAPD, initializing the backhaul connection with the EAPD on a first channel of a plurality of channels based on the initial backhaul configuration with the backhaul SSID and the one or more credentials, determining whether the connection with the EAPD on the first channel is established and in response to the backhaul connection with the EAPD not being established performing a dynamic channel selection function to initialize the backhaul connection with the EAPD on a second channel of the plurality of channels and establishing the backhaul connection with the EAPD on the second channel.

In an aspect of the present disclosure, the processor is further configured to execute the one or more computer-readable instructions to perform one or more further operations, the one or more further operations comprising indicating that the backhaul connection is established.

In an aspect of the present disclosure, the indicating that the backhaul connection is established utilizes any of one or more indicators, a user interface of an application, or a combination thereof.

In an aspect of the present disclosure, the performing dynamic channel selection function comprises looping from the first channel to one or more channels of the plurality of channels and selecting the second channel from the one or more channels based, at least in part, on one or more factors.

In an aspect of the present disclosure, the one or more factors comprise any of a power level, a signal strength, a noise, an interference, a bandwidth capacity, a channel utilization, or a combination thereof.

In an aspect of the present disclosure, the perform the dynamic channel selection function comprises selecting as the second channel a channel from one or more upper range channels of the plurality of channels, wherein the one or more upper range channels includes U-NII-3 channels in the range of 5.725 GHz to 5.85 GHz, including: channels 149, 153, 157, 161, and 165 in the case of the access point device operating with 20 MHz wide channels, channels 151 and 159 in the case of the access point device operating with 40 MHz wide channels, and channel 155 in the case of the access point device operating with 80 MHz wide channels.

In an aspect of the present disclosure, the in response to the backhole connection with the extender access point device not being established further comprises receiving a request from an application to perform the dynamic channel selection function.

An aspect of the present disclosure provides a method for an access point device (APD) to establish a backhaul connection to an extender access point device (EAPD). The method can include establishing an initial fronthaul connection to the EAPD over a fronthaul service set identifier (SSID) as part of a Wi-Fi protected setup (WPS) operation, sending an initial backhaul configuration with a backhaul SSID and one or more credentials to the EAPD, initializing the backhaul connection with the EAPD on a first channel of a plurality of channels based on the initial backhaul configuration with the backhaul SSID and the one or more credentials, determining whether the connection with the EAPD on the first channel is established, and in response to the backhaul connection with the EAPD not being established performing a dynamic channel selection function to initialize the backhaul connection with the EAPD on a second channel of the plurality of channels and establishing the backhaul connection with the EAPD on the second channel.

In an aspect of the present disclosure, the method further comprises indicating that the backhaul connection is established.

In an aspect of the present disclosure, the indicating that the backhaul connection is established utilizes any of one or more indicators, a user interface of an application, or a combination thereof.

In an aspect of the present disclosure, the performing the dynamic channel selection function comprises looping from the first channel to one or more channels of the plurality of channels and selecting the second channel from the one or more channels based, at least in part, on one or more factors.

In an aspect of the present disclosure, the one or more factors comprise any of a power level, a signal strength, a noise, an interference, a bandwidth capacity, a channel utilization, or a combination thereof.

In an aspect of the present disclosure, the perform the dynamic channel selection function comprises selecting as the second channel a channel from one or more upper range channels of the plurality of channels, wherein the one or more upper range channels includes U-NII-3 channels in the range of 5.725 GHz to 5.85 GHz, including: channels 149, 153, 157, 161, and 165 in the case of the access point device operating with 20 MHz wide channels, channels 151 and 159 in the case of the access point device operating with 40 MHz wide channels, and channel 155 in the case of the access point device operating with 80 MHz wide channels.

In an aspect of the present disclosure, the in response to the backhaul connection with the extender access point device not being established further comprises receiving a request from an application to perform the dynamic channel selection function.

An aspect of the present disclosure provides a non-transitory computer readable medium of an access point device (APD) storing a program for establishing a backhaul connection with an extender access point device (EAPD). The program when executed by a processor of the APD, caused the APD to perform one or more operations including the steps of the methods described above.

An aspect of the present disclosure provides a client device for use with an access point device (APD) and an extender access point device (EAPD) to establish a backhaul connection between the APD and the EAPD. The client device comprises a memory storing one or more computer-readable instructions and a processor configured to execute the one or more computer-readable instructions to perform one or more operations, the one or more operations comprising establishing an APD connection with the APD over Bluetooth low energy (BLE), receiving an initial backhaul configuration with a backhaul SSID and one or more credentials, establishing an EAPD connection with the EAPD over BLE to perform onboarding of the EAPD, sending the initial backhaul configuration with the backhaul SSID and the one or more credentials to the EAPD over BLE via the EAPD connection, determining whether a backhaul connection with the EAPD on a first channel is established based on the initial backhaul configuration with the backhaul SSID and the one or more credentials, in response to the backhaul connection with the EAPD not being established instructing the APD to perform a dynamic channel selection function to initialize the backhaul connection with the EAPD on a second channel of the plurality of channels to establish the backhaul connection with the EAPD on the second channel.

In an aspect of the present disclosure, the processor is further configured to execute the one or more computer-readable instructions to perform one or more further operations, the one or more further operations comprising indicating that the backhaul connection is established.

In an aspect of the present disclosure, the instructing the APD to perform a dynamical section function is initiated by a user.

In an aspect of the present disclosure, the processor is further configured to execute the one or more computer-readable instructions to perform one or more further operations, the one or more further operations comprising indicating one or more instructions to a user.

In an aspect of the present disclosure, the processor is further configured to execute the one or more computer-readable instructions to perform one or more further operations, the one or more further operations comprising establishing a connection with the APD, the EAPD or both over a Wi-Fi connection after the BH connection has been established.

In an aspect of the present disclosure, the processor is further configured to execute the one or more computer-readable instructions to perform one or more further operations, the one or more further operations comprising receiving status information from the APD and wherein the determination whether the backhaul connection with the EAPD on the first channel is established based on the status information.

In an aspect of the present disclosure, wherein instructing the APD to perform a dynamic channel selection function comprises sending a specified power level to the dynamic channel selection function.

An aspect of the present disclosure provides a method for a client device to establish a backhaul connection between an access point device and an extender access point device (EAPD). The method can include establishing an APD connection with the APD over Bluetooth low energy (BLE), receiving an initial backhaul configuration with a backhaul SSID and one or more credentials, establishing an EAPD connection with the EAPD over BLE to perform onboarding of the EAPD, sending the initial backhaul configuration with the backhaul SSID and the one or more credentials to the EAPD over BLE via the EAPD connection, determining whether a backhaul connection with the EAPD on a first channel is established based on the initial backhaul configuration with the backhaul SSID and the one or more credentials, in response to the backhaul connection with the EAPD not being established instructing the APD to perform a dynamic channel selection function to initialize the backhaul connection with the EAPD on a second channel of the plurality of channels to establish the backhaul connection with the EAPD on the second channel.

In an aspect of the present disclosure, the method further comprises indicating that the backhaul connection is established.

In an aspect of the present disclosure, the method further comprises indicating one or more instructions to a user.

In an aspect of the present disclosure, the instructing the access point device to perform a dynamic channel selection function is initiated by a user.

In an aspect of the present disclosure, the method further comprises establishing a connection with the APD, the EAPD or both over a Wi-Fi connection after the BH connection has been established.

In an aspect of the present disclosure, the method further comprises receiving status information from the APD and wherein the determination whether the backhaul connection with the EAPD on the first channel is established based on the status information.

In an aspect of the present disclosure, the instructing the APD to perform a dynamic channel selection function comprises sending a specified power level to the dynamic channel selection function.

An aspect of the present disclosure provides a non-transitory computer-readable medium of a client device storing a program for establishing a backhaul connection between an access point device (APD) and an extender access point device (EAPD). The program when executed by a processor of the client device, causes the client device to perform one or more operations including the steps of the methods described above.

The above-described electronic apparatus(es) may be implemented as any of a residential network access point device, an electronic device (for example, a mobile phone, a computing device such as a notebook computer, or both) according to some example embodiments.

Thus, according to various aspects of the present disclosure described herein, it is possible to determine that a BH connection between a access point device and an extender access point device has not been established for a selected channel and in response to the determination perform dynamical looping through channels using a dynamic channel selection function so as to select a suitable channel for establishment of the BH connection between the access point device and the extender access point device. The novel solution described herein addresses the problem of failure of an access point device to establish a BH connection with an extender access point device without requiring user interaction or relocation of the extender access point device. Such a novel solution will significantly enhance the installation and configuration of home/residential network access point devices, wireless access point devices (Wi-Fi APs), HNC devices, wireless routers, mesh networking nodes (e.g., Wi-Fi EasyMesh systems), and the like. In particular, the novel solution provides improvements for backhaul association application for MAP/Wi-Fi EasyMesh as well as HNC environments.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
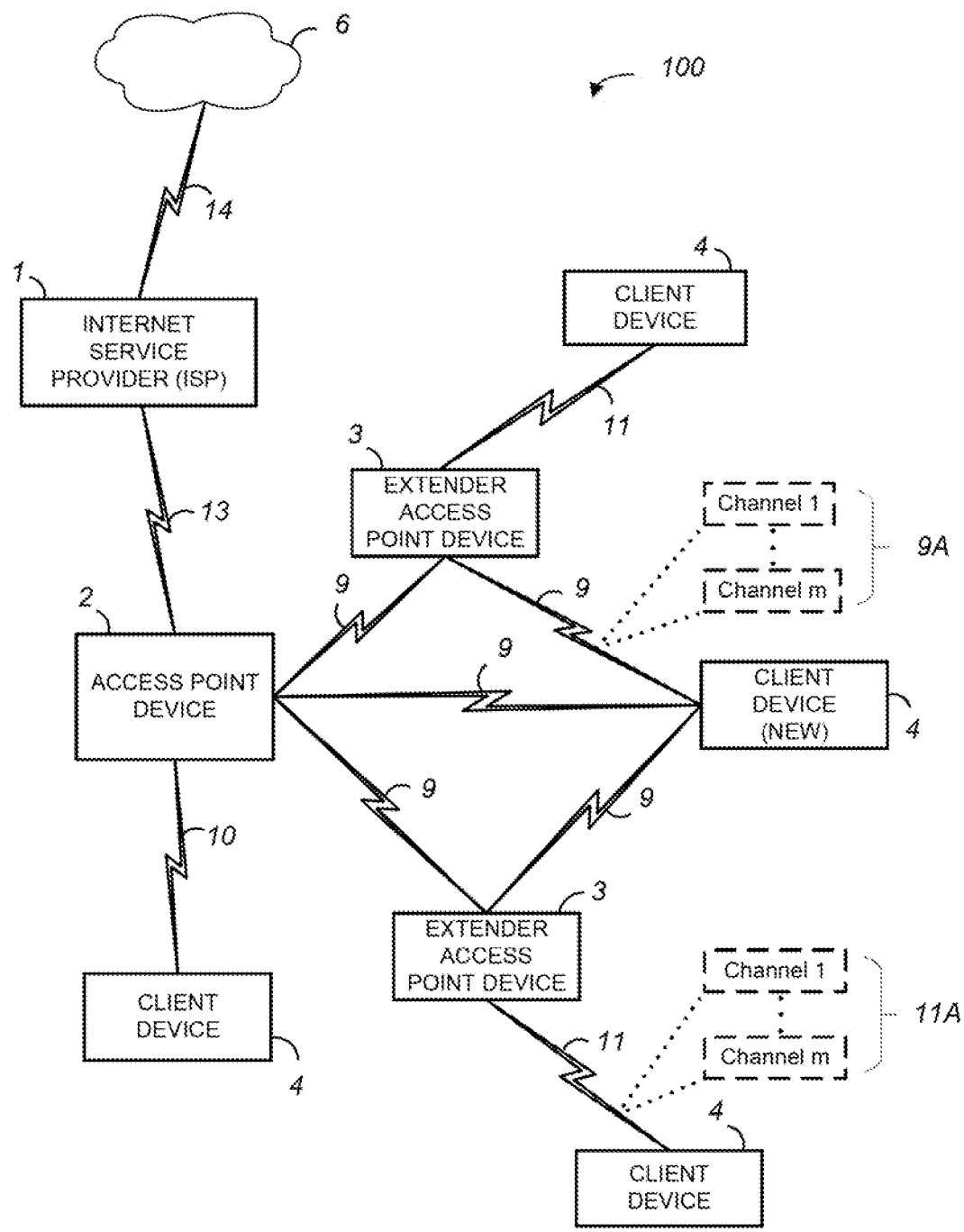
FIG. 1 is a schematic diagram of a system, according to an embodiment of the present disclosure.

FIG. 1 is a schematic diagram of a system, according to one or more example embodiments.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the system 100 include an access point device 2 connected to the Internet 6 via an Internet Service Provider (ISP) 1 and also connected to different wireless devices such as wireless extender access point devices 3 and client devices 4. The system 100 shown in FIG. 1 includes wireless devices (e.g., extender access point devices 3 and client devices 4) that may be connected in one or more wireless networks (e.g., private, guest, iControl, backhaul network, or Internet of things (IoT) network) within the system 100. Additionally, there could be some overlap between wireless devices (e.g., extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

Starting from the top of FIG. 1, the ISP 1 can be, for example, a streaming video provider or any computer for connecting the access point device 2 to the Internet 6. The connection 14 between the Internet 6 and the ISP 1 and the connection 13 between the ISP 1 and the access point device 2 can be implemented using a wide area network (WAN), a virtual private network (VPN), metropolitan area networks (MANs), system area networks (SANs), a data over cable service interface specification (DOC SIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for providing content received from the content provider 1 to network devices (e.g., wireless extender access point devices 3 and client devices 4) in the system 100. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2, the wireless extender access point devices 3, and client devices 4 can be implemented using a wireless connection in accordance with any IEEE 802.11 Wi-Fi protocols, Bluetooth protocols, BLE, or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels 9A that are available for use.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may out of range of the access point device 2. The extender access point devices 3 can also receive signals from the client devices 4 and rebroadcast the signals to the access point device 2, or other client devices 4.

The connection 11 between the extender access point devices 3 and the client devices 4 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection. Any one or more connections 11 can carry information on any one or more channels 11A that are available for use.

The client devices 4 can be, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2. Further, a client device 4 can be an electronic device that includes an application for establishing a connection with the access point device 2 and the extender access point device 3 and for initiating a BH connection between the access point device 2 and the extender access point device 3 as described with reference to FIG. 5.

The connection 10 between the access point device 2 and the client device 4 is implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. One or more of the connections 10 can also be a wired Ethernet connection.

Figure 2:
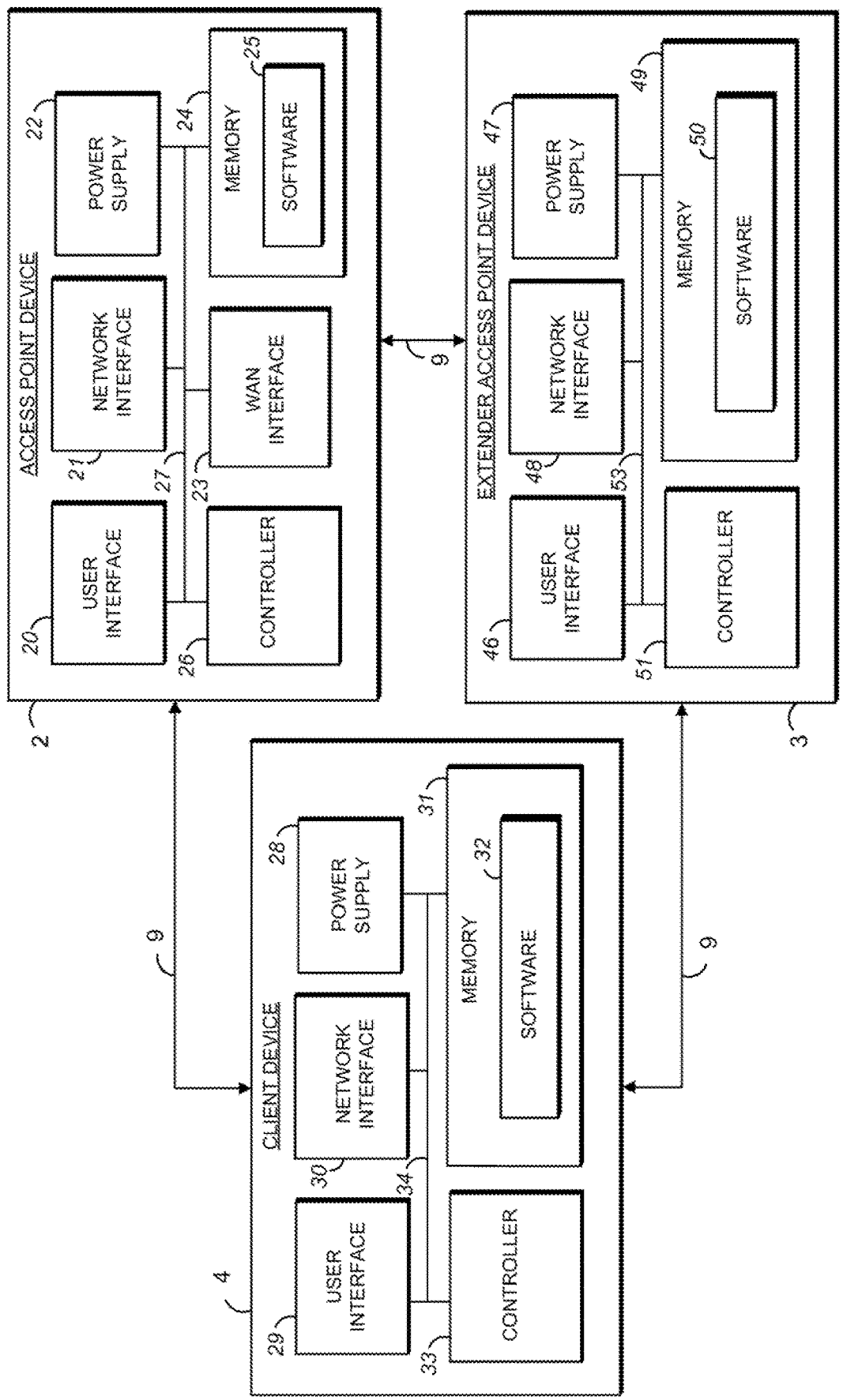
FIG. 2 is a more detailed block diagram illustrating various components of an exemplary access point device, client device, and extender access point device implemented in the system of FIG. 1 according to an embodiment of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the system 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices over the one or more network connections to local and wide area networks, wireless and wired networks, public and private networks, and any other communication network enabling communication in the system 100.

FIG. 2 is a more detailed block diagram illustrating various components of an exemplary access point device, client device, and wireless extender implemented in the system of FIG. 1, according to some example embodiments.

Although FIG. 2 only shows one extender access point device 3 and one client device 4, the extender access point device 3 and the client device 4 shown in the figure are meant to be representative of the other extender access point devices 3 and client devices 4 of a network system, for example, system 100 shown in FIG. 1. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

Now referring to FIG. 2 (e.g., from left to right), the client device 4 can be, for example, a computer, a portable device, an electronic tablet, an e-reader, a PDA, a mobile phone such as a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. Additionally, the client device 4 can be a TV, an IP/QAM STB, or an SMD that is capable of decoding audio/video content, and playing over OTT or MSO provided content received through the access point device 2.

As shown in FIG. 2, the client device 4 includes a power supply 28, a user interface 29, a network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the access point device 2 and the extender access point device 3 using the communication protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, client device 4 is an electronic device, such as a mobile phone, and software 32 includes one or more instructions for establishing a connection with the access point device 2 and the extender access point device 3 so as to initiate a BH connection between access point device 2 and the extender 3 as described with reference to FIG. 5.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to client devices 4, which may be out of range of the access point device 2 including, but not limited to, a wireless extender, a repeater, and/or an AP. The extender access point device 3 can also receive signals from any one or more of the client devices 4 and rebroadcast the signals to the access point device 2, mobile device 5, or any other one or more client devices 4.

As shown in FIG. 2, the extender access point device 3 includes a user interface 46, a power supply 47, a network interface 48, a memory 49, and a controller 51.

The user interface 46 can include, but is not limited to, push buttons, a keyboard, a keypad, an LCD, a TFT, an LED, an HD or other similar display device including a display device having touch screen capabilities so as to allow interaction between a user and the extender access point device 3.

The power supply 47 supplies power to the internal components of the wireless extender access point device 3 through the internal bus 53. The power supply 47 can be connected to an electrical outlet (e.g., either directly or indirectly by way of another device) via a cable or wire.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a BH connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul (FH) connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender access point device 3 in accordance with the embodiments described in the present disclosure. General communication between the components (e.g., 46-49 and 51) of the extender access point device 3 may be established using the internal bus 53.

The access point device 2 can be, for example, a hardware electronic device that can combine one or more functions of any of a modem, a gateway, an access point (AP), a router, or combinations thereof for providing content received from the content provider (ISP) 1 to network or wireless devices (e.g., extender access point devices 3, client devices 4) in the system. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26.

The user interface 20 can include, but is not limited to, push buttons, a keyboard, a keypad, an LCD, a TFT, an LED, an HD or other similar display device including a display device having touch screen capabilities so as to allow interaction between a user and the access point device 2.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a BH connection between the access point device 2 and the wireless extender access point device(s) 3. Another radio or set of radios (e.g., 2.4 GHz, 5 GHz, and/or 6 GHz radio(s)) provides a FH connection between the access point device 2 and one or more client device(s) 4.

The power supply 22 supplies power to the internal components of the access point device 2 through the internal bus 27. The power supply 22 can be connected to an electrical outlet (e.g., either directly or by way of another device) via a cable or wire.

The wide area network (WAN) interface 23 may include various network cards, and circuitry implemented in software and/or hardware to enable communications between the access point device 2 and the ISP 1 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the access point device 2 and performing management functions related to the other devices (wireless extender access point devices 3 and client devices 4) in the network in accordance with the embodiments described in the present disclosure (e.g., including a dynamic channel selection function according to some example embodiments of the present disclosure).

The controller 26 controls the general operations of the access point device 2 as well as performs management functions related to the other devices (wireless extender access point devices 3 and client device 4) in the network. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure. Communication between the components (e.g., 20-24, and 26) of the access point device 2 may be established using the internal bus 27. The controller 26 may also be referred to as a processor, generally.

Figure 3:
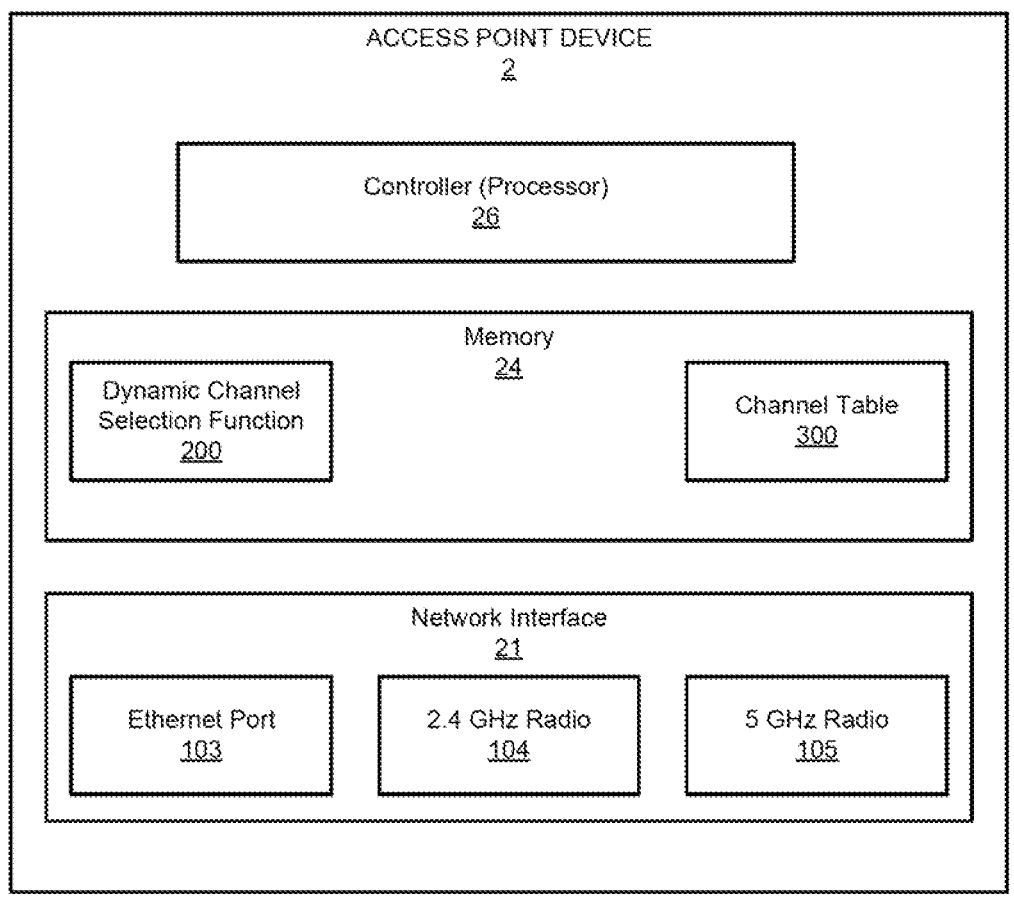
FIG. 3 is a more detailed block diagram illustrating certain components of an exemplary access point device implemented in the system of FIGS. 1-2 according to an embodiment of the present disclosure.

FIG. 3 is a more detailed block diagram illustrating certain components of an exemplary access point device implemented in the system of FIGS. 1 and 2, according to some example embodiments.

As shown in FIG. 3, the access point device 2 includes the network interface 21, the memory 24, and the controller (processor) 26.

The network interface 21 includes an Ethernet port 103 (e.g., a wired LAN interface), a 2.4 GHz radio 104 and a 5 GHz radio 105 (e.g., wireless LAN interfaces, or WLAN interfaces). The access point device 2 may communicate with the local area network devices (e.g., the extender access point devices 3, the client devices 4) of a system, for example, system 100 of FIG. 1, via one or more of the Ethernet port 103, the 2.4 GHz radio 104, and/or the 5 GHz radio 105. However, some other example embodiments of inventive concepts of the present disclosure are not limited to these interfaces only (e.g., the techniques may be applied with a 6 GHz radio or other similar future developed technologies). As mentioned above, according to aspects of the present disclosure, one radio or set of radios can operate as a BH radio to provide a BH connection between the access point device 2 and the wireless extender access point device(s) 3, while another radio or set of radios can provide a FH connection between the access point device 2 and the client device(s) 4.

The memory 24 includes a dynamic channel selection function 200 and a channel table 300. The dynamic channel selection function 200 may be implemented as part of the instructions, algorithms, or software including the software 25 described above with reference to FIG. 2. The channel table 300 may be a data structure storing various pieces of data relating to the LAN, Wi-Fi channels, client devices, and certain values for use when performing operations in accordance with embodiments described in the present disclosure (e.g., including the dynamic channel selection function 200 according to some example embodiments).

The controller 26 includes a processor that is configured to access the memory 24, perform the dynamic channel selection function 200 (e.g., via execution of the software 25), and make wireless channel selection determinations based, at least in part, on one or more factors, including, but not limited to, any of the information in channel table 300, power level, signal strength, noise, interference, bandwidth capacity, channel utilization, or a combination thereof. The processor of the controller 26 also controls communications with the network or wireless devices (e.g., the wireless extender access point devices 3, the client devices 4) via the Ethernet port 103, the 2.4 GHz radio 104, and/or the 5 GHz radio 105 in accordance with embodiments described in the present disclosure.

Problems can occur during installation and/or configuration of one or more network or wireless devices in a system. For example, an extender access point device 3 can experience failures when attempting to associate or connect to an access point device 2. These failures can cause a user to assume that the network or wireless device is incapable of establishing a BH connection to the access point device 2 and/or that some other issue exists with the network or wireless device. A user may also unnecessarily assume that the network or wireless device must be relocated which can be costly in terms of both time and expense. Therefore, there is a need to provide improved electronic apparatuses (e.g., access point devices, extender access point devices, client devices) that are configured to perform a method to establish a BH association/connection between an access point device and an extender access point device without requiring user intervention or relocation of a network or wireless device, for example, an extender.

Figure 4:
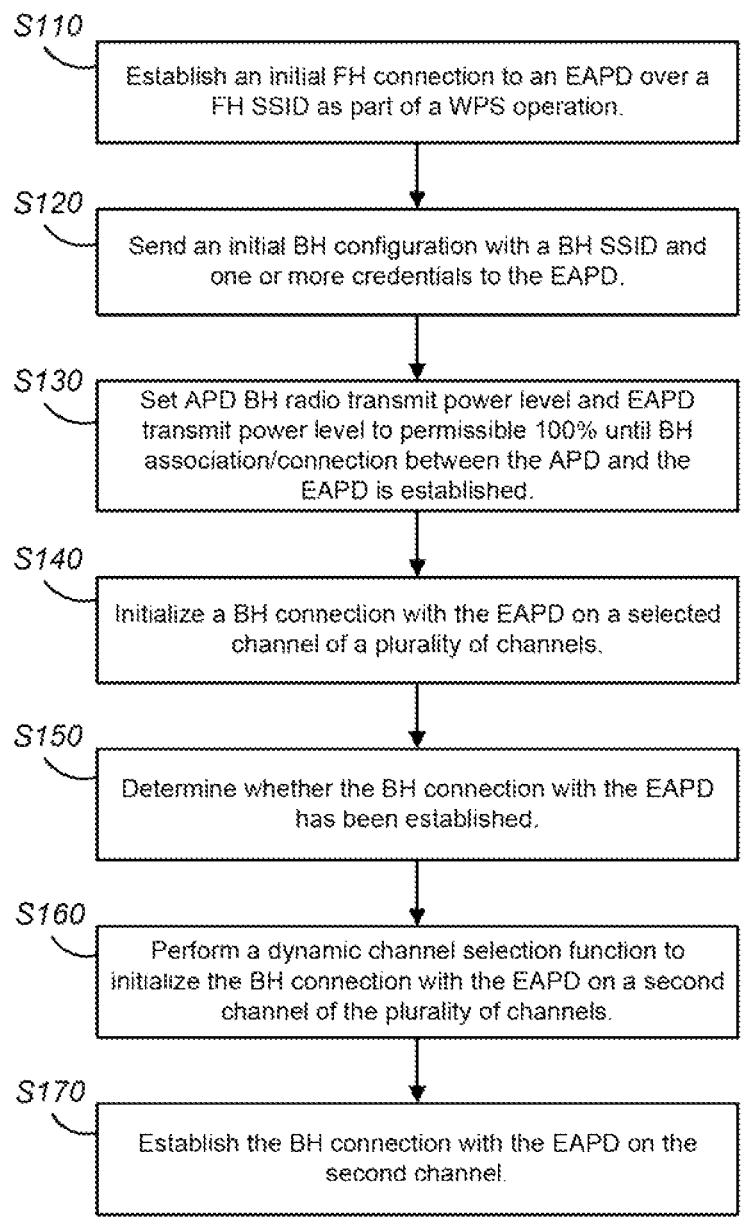
FIG. 4 is a flow chart illustrating a method for dynamic channel selection, according to an embodiment of the present disclosure.

FIG. 4 is a flow chart illustrating a method for dynamic channel selection, according to some example embodiments.

The access point device 2 may be programmed with one or more instructions (e.g., HNC controller instructions) to perform the dynamic channel selection function 200 in some example embodiments, or may use its native software in some other example embodiments. In FIG. 4, it is assumed that the devices include their respective controllers and their respective software stored in their respective memories, as discussed above in connection with FIGS. 2-3, which when executed by their respective controllers perform the functions and operations in accordance with the example embodiments of the present disclosure (e.g., including performing a dynamic channel selection function 200).

The access point device 2 comprises a controller 26 that executes one or more computer-readable instructions, stored on a memory 24, that when executed perform one or more of the operations of steps S110-S170. In one or more embodiments, the one or more instructions can be one or more software applications, for example, one or more software 25. While the steps S110-S170 are presented in a certain order, the present disclosure contemplates that any one or more steps can be performed simultaneously, substantially simultaneously, repeatedly, in any order or not at all (omitted).

At step S110, the access point device 2 for use with an extender access point device 3 establishes an initial FH connection to the extender access point device 3 over a FH SSID as part of a WPS operation. For example, to associate or connect an access point device 2 with an extender access point device 3, an initial momentary FH connection between the access point device 2 and the extender access point device 3 is made as part of a WPS operation. In the case of EasyMesh, as part of the Registration Protocol which includes messages M1-M8, the last part of the initial WPS connection M8 message will comprise the BH SSID and one or more credentials so that this initial FH connection need only be momentary.

At step S120, an initial BH configuration with a BH SSID and the one or more credentials are sent from the access point device 2 to the extender access point device 3. For example, after establishment of the momentary FH connection, the BH onboarding of the extender access point device 3 begins. In one or more embodiments, the extender access point device 3 is a virtual access point (VAP) and the access point device 2 is a residential gateway (RG). In one or more embodiments, the push of the BH SSID and the one or more credentials occurs once the initial FH connection to the extender access point device 3 is over. For example, for an EasyMesh configuration, the last part of the initial WPS connection M8 message comprises the BH SSID and the one or more credentials.

At step S130, the transmit power level of the access point device BH radio (for example, the 2.4 GHz radio 104 or the 5 GHz radio 105) and the transmit power level of the extender access point device 3 may be set to a permissible 100% until the BH association/connection is established between the access point device 2 and the extender access point device 3. Generally, the transmit power control (TPC) of the access point device 2 and the extender access point device 3 should be set to "off", if not previously set, to ensure that during the initiation and establishment of the BH connection between the access point device 2 and the extender access point device 3, the transmit power level remains at the permissible 100% or highest permissible level.

At step S140, the access point device 2 initializes a BH connection with the extender access point device 3 on a first channel of a plurality of channels of the access point device 2 based on the initial BH configuration with the BH S SID and the one or more credentials. For example, as discussed with reference to FIG. 1, any one or more channels (e.g., Channels 1-m, where m represents any available number of channels) associated with connection 9 and/or connection 11 (collectively referred to as Channels 9A and Channels 11A, respectively), can be used for establishing the BH connection over an associated connection, for example, connections 9 and/or 11. The first channel can be a default channel of the access point device 2 that is preset, for example, by the manufacturer, system administrator or by any other source or user, or may be a channel selected at the time of initialization, for example, by the user installing or configuring the system.

In one or more embodiments, the plurality of channels available to use for establishing a BH connection over a connection, for example, connection 9, between the access point device 2 and the extender access point device 3 are channels as identified by IEEE 802.11. For example, according to IEEE 802.11 Wi-Fi standards, the 5 GHz channels are in the range from 5.15-5.35 GHz (channels 32 through 68) and 5.47-5.85 GHz (channels 96 through 165). In the United States, for example, these 5 GHz channels are currently divided into 4 groups (also referred to as U.S. FCC U-NII bands):

(1) U-NII-1 (5.15-5.25 GHz) including channels in the range of 32-48,
(2) U-NII-2a (5.25-5.35 GHz) including channels in the range 52-68,
(3) U-NII-2c (extended) (5.47-5.725 GHz) including channels in the range of 96-144, and
(4) U-NII-3 (5.725-5.85 GHz) including channels in the range of 149-165.

These 5 GHz channels may be referred to as a lower range (e.g., channels 36 through 48, and optionally channel 32), a middle range (e.g., channels 52 through 64 and channels 100 through 144, and optionally channels 68 and 96), and an upper range (e.g., channels 149 through 161, and optionally 165). In some instances, the 20 MHz wide channels at the edges of the U-NII bands that are available for unlicensed Wi-Fi use may or may not be used by access point devices and APs (e.g., channels 32, 68, 96, 165 are optional, but may not be as commonly used in some network deployments for various reasons).

The 5 GHz channels in the middle range (e.g., channels 50 through 68 and channels 100 through 144) are known as DFS channels, referring to a Dynamic Frequency Selection function that enables WLAN devices to use 5 GHz frequencies that are generally reserved for radar (e.g., military, weather). However, some access point devices and APs may not have a DFS function equipped (e.g., to save costs) or may have the DFS function disabled by default (e.g., to avoid recurring loss of wireless connectivity while periodically scanning the available frequencies in the DFS band). Even with the DFS function enabled, however, many currently existing client devices cannot even be tuned to the intermediate DFS channels. Thus, the intermediate DFS channels (e.g., channels 52 through 68 and channels 96 through 144) in the 5 GHz band are often avoided by access point devices and APs for establishing connections with client devices in most Wi-Fi deployments.

In a case of using 20 MHz wide channels within the 5 GHz band, there are at least 24 non-overlapping channels (and optionally up to 28 non-overlapping channels in some instances): (1) Group U-NII-1 may include channels 36, 40, 44, 48 (and optionally channel 32 in some instances); (2) Group U-NII-2a may include channels 52, 56, 60, 64 (and optionally channel 68 in some instances), and Group U-NII-2c (extended) may include channels 100, 104, 108, 112, 116, 120, 124, 128, 132, 136, 140, 144 (and optionally channel 96 in some instances); and (3) Group U-NII-3 may include channels 149, 153, 157, 161 (and optionally channel 165 in some instances). Use of 20 MHz wide channels is common in many currently existing Wi-Fi deployments, and may be more desirable for densely populated environments over 40 MHz wide channels due to having less noise, better sensitivity, more transmit power, and the like. In the 20 MHz wide channel case, there are 8 non-overlapping non-DFS channels (e.g., channels 36, 40, 44, 48, 149, 153, 157, 161, and optionally 10 non-overlapping non-DFS channels if channels 32 and 165 are permitted) in the 5 GHz band.

In a case of using 40 MHz wide channels within the 5 GHz band, there are 12 non-overlapping channels: (1) Group U-NII-1 may include channels 38, 46; (2) Group U-NII-2a may include channels 54, 62, and Group U-NII-2c (extended) may include channels 102, 110, 118, 126, 134, 142; and (3) Group U-NII-3 may include channels 151, 159. Use of 40 MHz wide channels may be preferable over 20 MHz wide channels in instances of heavy file transfers, HD video streaming, and other high bandwidth-intensive applications. In the 40 MHz wide channel case, there are 4 non-overlapping non-DFS channels (e.g., channels 38, 46, 151, 159) in the 5 GHz band.

In a case of using 80 MHz wide channels within the 5 GHz band, there are 6 non-overlapping channels: Group U-NII-1 may include channel 42; Group U-NII-2a may include channel 58, and Group U-NII-2c (extended) may include channels 106, 122, 138; and Group U-NII-3 may include channel 155. The 80 MHz wide channels may be used in quieter and more sparsely populated network environments (with corresponding performance gains and more throughput), but may not be appropriate for denser deployments. In the 80 MHz wide channel case, there are only 2 non-overlapping non-DFS channels (42, 155) in the 5 GHz band. It should be noted that 160 MHz channels are currently only used for small office/home office (SOHO) WLAN AP deployments or for point-to-point communications (160 MHz wide channels are not currently being used by existing enterprise APs). Pending approval of use of the 6 GHz band for public Wi-Fi purposes is needed in order for residential access point devices, enterprise APs, and most client devices to take advantage of 160 MHz wide channels, as well as to enhance the use of 80 MHz wide channels.

Therefore, 80 MHz wide channels and 160 MHz wide channels are not being used in most currently existing Wi-Fi deployments.

At step S150, the access point device 2 determines whether the BH connection is established with the extender 5 on the selected channel. Initially, for example, the selected channel can be referred to as the first channel. In one or more embodiments, the software 25 of the access point device 2 may comprise one or more computer-readable instructions stored in memory 24 that when executed by a processor, for example, controller 26, cause one or more operations to be performed including monitoring status of the BH connection between the extender access point device 3 and the access point device 2. If the status indicates that a BH connection between the extender access point device 3 and the access point device 2 has been established on the selected channel the process terminates or ends. If the status indicates, for example, that the extender access point device 3 is still connected to the access point device 2 via the FH connection or the extender access point device 3 has not yet connected to the access point device 2 via the BH connection, the process continues to step S160. In one or more embodiments, one or more indicators can be used to indicate failure of the BH connection, for example, any of a visual or audio notification at a user interface of an application of electronic device or apparatus, such as a mobile phone, one or more visual indicators at the access point device 2, such as one or more LEDs, any other visual or audio indicators, or combinations thereof.

In response to the BH connection between the access point device 2 and the extender access point device 3 not being established, at step S160, a dynamic channel selection function 200 of the access point device 2 is performed to initialize the BH connection with the extender access point device 3 on a different channel, for example, a second channel, of the plurality of channels. The dynamic channel selection function 200 can include software, for example, software 25, that comprises one or more computer-readable instructions stored in memory 24 that when executed by a processor, for example, controller 26, cause one or more operations to be performed. In one or more embodiments, the dynamic channel selection function 200 is performed based on receiving a request from an application (for example, as discussed with referenced to FIG. 5), a user input, a reboot on the extender, a new BH configuration push, or any other input that causes a subsequent or additional initiation of a BH connection with the extender access point device 3.

In one or more embodiments, the dynamic channel selection function 200 can loop through the plurality of channels of the access point device 2 one by one until a channel is selected that provides for establishment of the BH connection to the extender access point device 3. For example, the dynamic channel selection function 200 may iterate sequentially through each channel of the plurality of channels or select a channel from the plurality of channels based on any one or more factors and for each channel selected steps S140-S160 are performed. The one or more factors can comprise any of power level, signal strength, noise, interference, bandwidth capacity, channel utilization, or a combination thereof. For example, the dynamic channel selection function 200 can select a channel based on permitted transmit power level, such as, moving from channel 48 to channel 100 or from channel 149 to channel 36. In another example, the dynamic channel selection function 200 can select a channel from one or more upper range channels of the plurality of channels.

At step S170, after the dynamic channel selection function 200 selects a channel, for example, referred to as the second channel of the plurality of channels, the BH connection with the extender access point device 3 is once again initiated and subsequently established on the selected channel (for example, the second channel). For example, steps S140-S160 are repeated until a BH connection is established on the selected channel (e.g., second channel) and/or until the process is terminated.

In the event that no selected channel permits or succeeds in establishment of a BH connection with the extender access point device 3, the user may be instructed or requested to relocate the extender access point device 3 closer to the access point device 2 whereupon any one or more steps S110-S170 can be performed. For example, any one or more of the steps S110-S170 can be performed for a predetermined time interval and/or based on any other network parameter and/or network configuration information.

Figure 5:
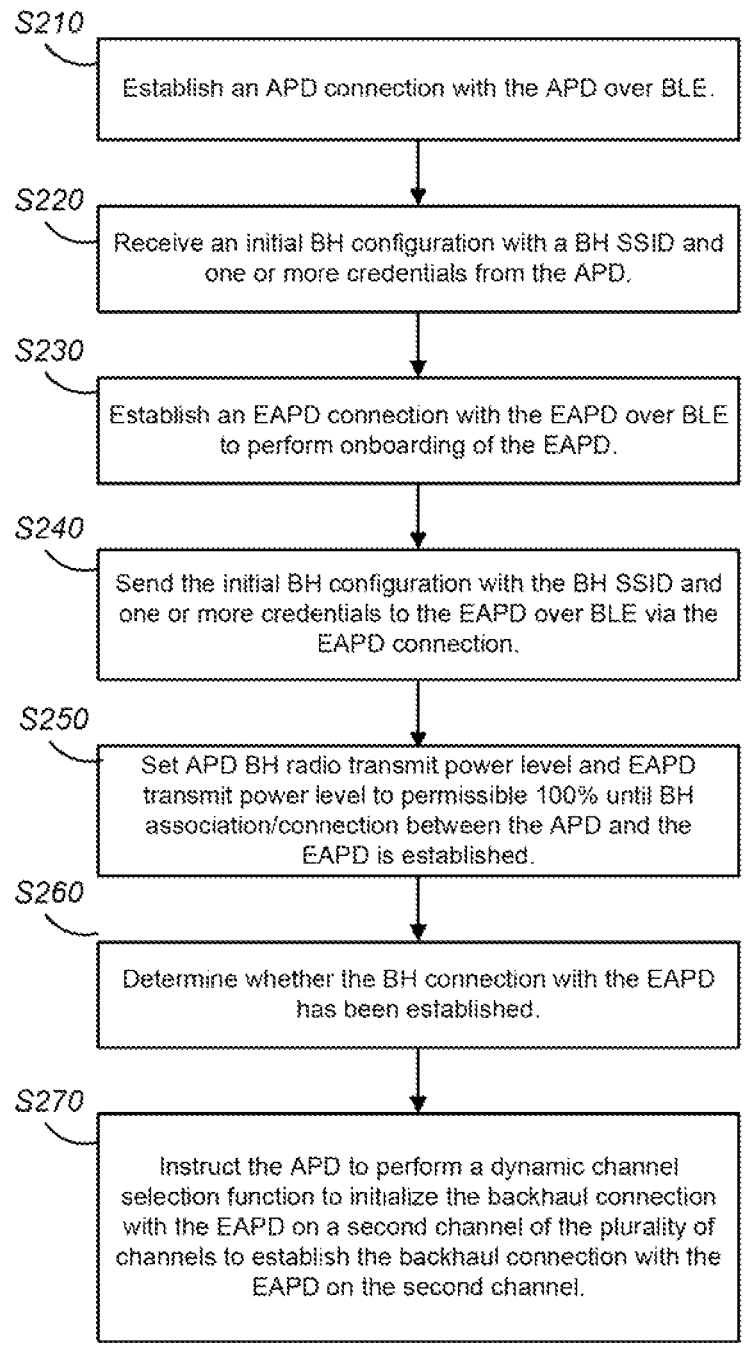
FIG. 5 is a flow chart illustrating a method for dynamic channel selection, according to an embodiment of the present disclosure.

FIG. 5 is a flow chart illustrating a method for dynamic channel selection, according to an embodiment of the present disclosure.

In one or more embodiments, a client device 4 may be an electronic device programmed with one or more instructions (e.g., software or application 32) to perform steps for initiating and establishing a BH connection between an access point device 2 and an expander device 3. In FIG. 5, it is assumed that the devices include their respective controllers and their respective software stored in their respective memories, as discussed above in reference to FIGS. 2-3, which when executed by their respective controllers perform the functions and operations in accordance with the example embodiments of the present disclosure (e.g., including performing a dynamic channel selection function 200).

The client device 4 comprises a controller 33 that executes one or more computer-readable instructions, stored on a memory 31, that when executed perform one or more of the operations of steps S210-S270. In one or more embodiments, the one or more instructions may be one or more software applications, for example, one or more software 32. While the steps S210-S270 are presented in a certain order, the present disclosure contemplates that any one or more steps can be performed simultaneously, substantially simultaneously, repeatedly, in any order or not at all (omitted).

At step S210, the client device 4 (also referred to as electronic device 4) for use with an access point device 2 and an extender access point device 3 first establishes a connection (referred to as an access point device connection) with access point device 2 over BLE or through an onboarding portal, for example, over connection 9, connection 10 and/or connection 11. In one or more embodiments, the access point device connection can be initiated by any of a user via software 32, interaction with a user interface including, but not limited to, one or more buttons or actuators of access point device 2 and/or client device 4, locating client device 4 within proximity of the access point device 2 so as to cause software 32 to execute, or any combination thereof.

At step S220, the client device receives an initial BH configuration with a BH SSID and one or more credentials from the access point device 2 over the access point device connection. For example, the access point device 2 can receive information from a cloud storage or cloud environment including, but not limited to, the initial BH configuration with a BH SSID and the one or more credentials.

At step S230, the client device 4 establishes a connection (referred to as an extender access point device connection) with an extender access point device 3 over BLE, for example, over connection 9 and/or connection 11 to perform onboarding of the extender access point device 3. In one or more embodiments, the extender access point device connection can be initiated by any of a user via software 32, interaction with a user interface including, but not limited to, one or more buttons or actuators of extender access point device 3 and/or client device 4, locating the client device 4 within proximity of the extender access point device 3 so as to cause software 32 to execute, or a combination thereof. In one or more embodiments, step S220 may occur after step S230.

At step S240, an initial BH configuration with a BH SSID and one or more credentials are sent from the client device 4 to the extender access point device 3 over the extender access point device connection.

At step S250, the transmit power level of the access point device BH radio (for example, the 2.4 GHz radio 104 or the 5 GHz radio 105) and the transmit power level of the extender access point device 3 may be set to a permissible 100% until the BH association/connection is established between the gateway device 2 and the extender access point device 3. Generally, the TPC should be set to "off", if not previously set, to ensure that during the initiation and establishment of the BH connection between the gateway device 2 and the extender access point device 3 the transmit power level remains at the permissible 100% or highest permissible level.

At step S260, the client device 4 determines whether the BH connection is established between the access point device 2 and the extender access point device 3 on the selected channel, for example, any one or more channels 9A and/or 11A associated with connections 9 and/or 11, respectively. Initially, for example, the selected channel will be referred to as the first channel. In one or more embodiments, the software 32 of the client device 4 may comprise one or more computer-readable instructions stored in memory 31, that when executed by a processor, for example, controller 26, cause one or more operations to be performed including monitoring status of the BH connection between the extender access point device 3 and the access point device 2. For example, the client device 4 can periodically request and/or automatically receive status information from the access point device 2. In one or more embodiments, the periodic request can be based, at least in part, on any of a predetermined time interval, a semaphore, a timer, a network parameter or network configuration information, a user input, or a combination thereof. If the status information indicates that a BH connection between the extender access point device 3 and the access point device 2 has been established on the selected channel the process terminates or ends. For example, the client device 4 can disconnect or end the access point device connection and/or the extender access point device connection.

If the status information indicates, for example, that the extender access point device 3 is still connected to the access point device 2 via the FH connection or the extender access point device 3 has not yet connected to the access point device 2 via the BH connection, the process continues to S270. In one or more embodiments, one or more indicators can be used to indicate failure of the BH connection, for example, any of a visual or audio notification at a user interface of an application of electronic device or apparatus, such as a client device 4, one or more visual indicators at the access point device 2, such as one or more LEDs, any other visual or audio indicators, or combinations thereof.

In response to the BH connection between the access point device 2 and the extender access point device 3 not being established, at step S270, the client device 4 instructs the access point device 2 to switch to a different channel. For example, the client device 4 via software 32 can instruct, request and/or command the access point device 2 via BLE or an onboarding portal to perform a dynamic channel selection function 200 so as to initialize the BH connection with the extender access point device 3 on a different channel, referred to as a second channel, of the plurality of channels of the access point device 2. The dynamic channel selection function 200 is discussed with reference to step S160 of FIG. 4. For example, the dynamic channel selection function 200 can be initiated by a user via a user interface of software 32 of the client device 4 and/or as discussed with reference to step S160 of FIG. 4. In one or more embodiments, the client device 4 can send to the dynamic channel selection one or more factors to the dynamic channel selection function, such as the one or more factors discussed with respect to step S160 of FIG. 4. For example, the client device 4 can instruct that the dynamic channel selection function 200 select one or more channels based on a specified power level.

Once the BH connection has been established, the client device 4 can end the access point device connection and/or the extender access point device connection. The client device 4 can establish another connection with the access point device 2 and/or the extender access point device, for example, a Wi-Fi connection, once the BH connection has been established.

In one or more embodiments, should the dynamic channel selection function 200 fail to establish a BH connection, the client device 4 can indicate one or more instructions to a user via, for example, a user interface of software 32. The one or more instructions can include requesting that the access point device 2 and/or the extender access point device 3 be relocated whereupon any one or more steps S210-S270 can be performed. For example, any one or more of the steps S210-S270 can be performed for a predetermined time interval and/or based on any other network parameter and/or network configuration information. In one or more embodiments, steps S260-S270 are performed until a BH connection has been established on the selected channel from the dynamic channel selector 200 and/or until the process is terminated.

According to some example embodiments of inventive concepts disclosed herein, there are provided novel solutions for establishing a BH connection between an access point device and an extender access point device utilizing a dynamic channel selection function of the access point device. In addition, there is provided an application of an electronic apparatus such as a mobile phone that causes the dynamic channel selection function to be performed. The novel solutions according to example embodiments of inventive concepts disclosed herein provide features that enhance the installation and configuration of home/residential network gateway (GW) devices, wireless access points (Wi-Fi APs), Home Network Controller (HNC) devices, wireless routers, mesh networking nodes (e.g., Wi-Fi EasyMesh systems), and the like.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. An access point device (APD) for use with an extender access point device (EAPD) and for establishing a backhaul connection to the EAPD, the APD comprising:
   a memory storing one or more computer-readable instructions;
   a processor configured to execute the one or more computer-readable instructions to perform one or more operations, the one or more operations comprising:
      establishing an initial fronthaul connection to the EAPD over a fronthaul service set identifier (SSID) as part of a Wi-Fi protected setup (WPS) operation;
      sending an initial backhaul configuration with a backhaul SSID and one or more credentials to the EAPD;
      initializing the backhaul connection with the EAPD on a first channel of a plurality of channels based on the initial backhaul configuration with the backhaul SSID and the one or more credentials;
      determining whether the connection with the EAPD on the first channel is established; and
      in response to the backhaul connection with the EAPD not being established:
         performing a dynamic channel selection function to initialize the backhaul connection with the EAPD on a second channel of the plurality of channels; and
         establishing the backhaul connection with the EAPD on the second channel.

2. The APD of claim 1, the processor is further configured to execute the one or more computer-readable instructions to perform one or more further operations, the one or more further operations comprising:
   indicating that the backhaul connection is established.

3. The APD of claim 2, wherein the indicating that the backhaul connection is established utilizes any of one or more indicators, a user interface of an application, or a combination thereof.

4. The APD of claim 1, wherein the performing the dynamic channel selection function comprises:
   looping from the first channel to one or more channels of the plurality of channels; and
   selecting the second channel from the one or more channels based, at least in part, on one or more factors.

5. The APD of claim 4, wherein the one or more factors comprise any of a power level, a signal strength, a noise, an interference, a bandwidth capacity, a channel utilization, or a combination thereof.

6. The APD of claim 1, wherein the perform the dynamic channel selection function comprises:
   selecting as the second channel a channel from one or more upper range channels of the plurality of channels, wherein the one or more upper range channels includes U-NII-3 channels in the range of 5.725 GHz to 5.85

GHz, including: channels 149, 153, 157, 161, and 165 in the case of the access point device operating with 20 MHz wide channels, channels 151 and 159 in the case of the access point device operating with 40 MHz wide channels, and channel 155 in the case of the access point device operating with 80 MHz wide channels.

7. The APD of claim 1, wherein the in response to the backhaul connection with the extender access point device not being established further comprises:
receiving a request from an application to perform the dynamic channel selection function.

8. A method for an access point device (APD) to establish a backhaul connection to an extender access point device (EAPD), the method comprising:
establishing an initial fronthaul connection to the EAPD over a fronthaul service set identifier (SSID) as part of a Wi-Fi protected setup (WPS) operation;
sending an initial backhaul configuration with a backhaul SSID and one or more credentials to the EAPD;
initializing the backhaul connection with the EAPD on a first channel of a plurality of channels based on the initial backhaul configuration with the backhaul SSID and the one or more credentials;
determining whether the connection with the EAPD on the first channel is established; and
in response to the backhaul connection with the EAPD not being established:
performing a dynamic channel selection function to initialize the backhaul connection with the EAPD on a second channel of the plurality of channels; and
establishing the backhaul connection with the EAPD on the second channel.

9. The method of claim 8, further comprising:
indicating that the backhaul connection is established.

10. The method of claim 9, wherein the indicating that the backhaul connection is established utilizes any of one or more indicators, a user interface of an application, or a combination thereof.

11. The method of claim 8, wherein the performing the dynamic channel selection function comprises:
looping from the first channel to one or more channels of the plurality of channels; and
selecting the second channel from the one or more channels based, at least in part, on one or more factors.

12. The method of claim 11, wherein the one or more factors comprise any of a power level, a signal strength, a noise, an interference, a bandwidth capacity, a channel utilization, or a combination thereof.

13. The method of claim 8, wherein the perform the dynamic channel selection function comprises:
selecting as the second channel a channel from one or more upper range channels of the plurality of channels, wherein the one or more upper range channels includes U-NII-3 channels in the range of 5.725 GHz to 5.85 GHz, including: channels 149, 153, 157, 161, and 165 in the case of the access point device operating with 20 MHz wide channels, channels 151 and 159 in the case of the access point device operating with 40 MHz wide channels, and channel 155 in the case of the access point device operating with 80 MHz wide channels.

14. The method of claim 8, wherein the in response to the backhaul connection with the extender access point device not being established further comprises:
receiving a request from an application to perform the dynamic channel selection function.

15. A non-transitory computer-readable medium of an access point device (APD) storing a program for establishing a backhaul connection with an extender access point device (EAPD), which when executed by a processor of the APD, causes the APD to perform operations comprising:
establishing an initial fronthaul connection to the EAPD over a fronthaul service set identifier (SSID) as part of a Wi-Fi protected setup (WPS) operation;
sending an initial backhaul configuration with a backhaul SSID and one or more credentials to the EAPD;
initializing the backhaul connection with the EAPD on a first channel of a plurality of channels based on the initial backhaul configuration with the backhaul SSID and the one or more credentials;
determining whether the connection with the EAPD on the first channel is established; and
in response to the backhaul connection with the EAPD not being established:
performing a dynamic channel selection function to initialize the backhaul connection with the EAPD on a second channel of the plurality of channels; and
establishing the backhaul connection with the EAPD on the second channel.

16. The non-transitory computer readable medium of claim 15, wherein the program, when further executed by the processor, causes the APD to perform further operations comprising:
indicating that the backhaul connection is established.

17. The non-transitory computer readable medium of claim 16, wherein the indicating that the backhaul connection is established utilizes any of one or more indicators, a user interface of an application, or a combination thereof.

18. The non-transitory computer readable medium of claim 15, wherein the performing the dynamic channel selection function comprises:
looping from the first channel to one or more channels of the plurality of channels; and
selecting the second channel from the one or more channels based, at least in part, on one or more factors.

19. The non-transitory computer readable medium of claim 18, wherein the one or more factors comprise any of a power level, a signal strength, a noise, an interference, a bandwidth capacity, a channel utilization, or a combination thereof.

20. The non-transitory computer readable medium of claim 15, wherein the in response to the backhaul connection with the extender access point device not being established further comprises:
receiving a request from an application to perform the dynamic channel selection function.

* * * * *